March 5, 1963
R. A. JOHNSON
3,080,538
CENTER CLAMPED TORSIONAL RESONATOR HAVING
BEARING SUPPORTED ENDS
Filed Feb. 19, 1959
2 Sheets-Sheet 1
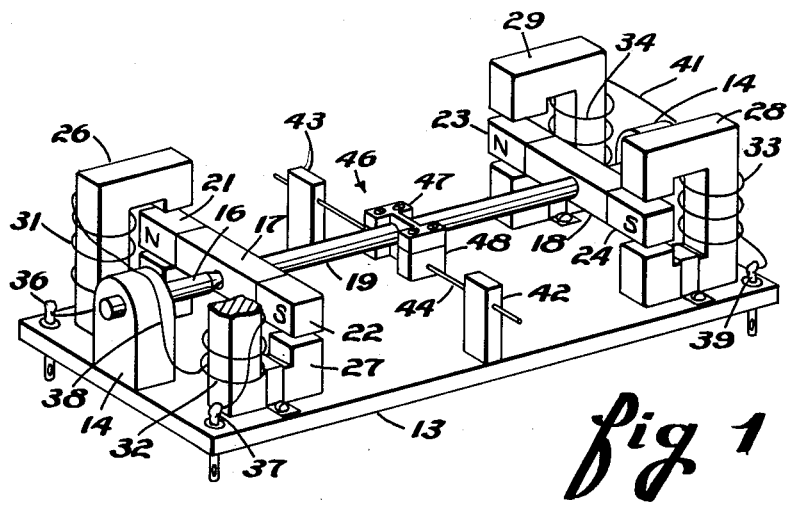
fig 1
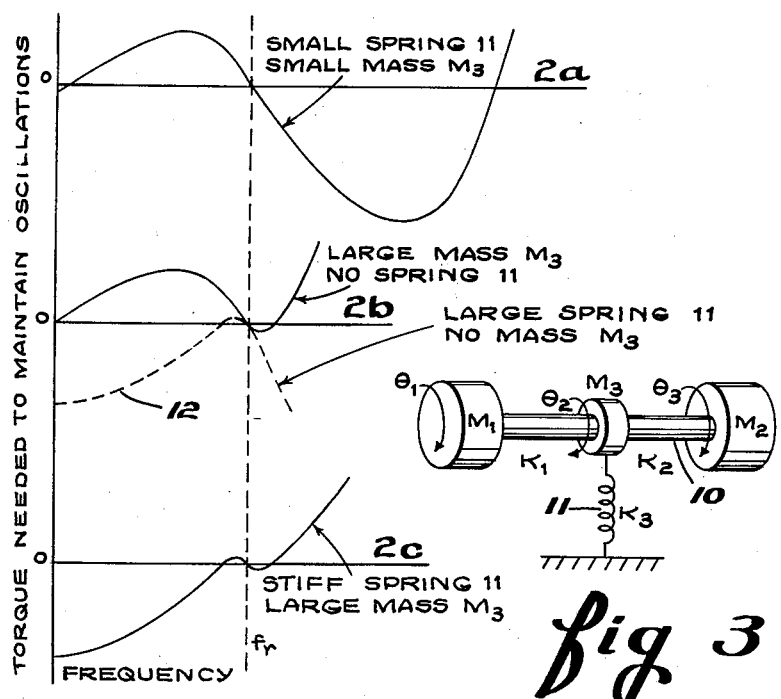
fig 2
fig 3
INVENTOR.
ROBERT A. JOHNSON
BY Marvin Moody
ATTORNEY March 5, 1963

R. A. JOHNSON 3,080,538

CENTER CLAMPED TORSIONAL RESONATOR HAVING
BEARING SUPPORTED ENDS

Filed Feb. 19, 1959

INVENTOR.
ROBERT A. JOHNSON
BY
ATTORNEY

United States Patent Office 3,080,538
Patented Mar. 5, 1963

3,080,538
CENTER CLAMPED TORSIONAL RESONATOR HAVING BEARING SUPPORTED ENDS
Robert A. Johnson, Sunland, Calif., assignor to Collins Radio Company, Cedar Rapids, Iowa, a corporation of Iowa
Filed Feb. 19, 1959, Ser. No. 794,327
3 Claims. (Cl. 333—71)

This invention relates in general to an electromechanical filter, and in particular to a torsional electromechanical filter.

Electromechanical filters have been developed over recent years which consist of apparatus which convert electrical energy to mechanical energy and then convert it back to electrical energy. Examples of such devices are shown in United States Patents 2,774,042 and 2,696,590.

The present invention relates to an electromechanical resonator of the torsional type, which has a driving and a driven mechanism at either end and is spring-damped at the center.

An object of this invention is to provide a torsional electromechanical resonator which obtains very close coupling in the electrical-to-mechanical transducers and has a desirable frequency response.

Another object of the invention is to provide an improved electromechanical resonator.

Further objects, features and advantages of the invention will become apparent from the following description and claims when read in view of the drawings, in which:

FIGURE 1 illustrates an electromechanical resonator according to this invention;

FIGURE 2 comprises various graphs showing relationships which exist among various parameters;

FIGURE 3 is a schematic illustration of a three-mass, three-spring torsional resonator;

FIGURE 3 is a schematic illustration showing a first mass $M_1$ connected to a shaft 10 which has a mass $M_2$ at its opposite end and a mass $M_3$ at its center. A spring 11 is connected from the mass $M_3$ to a fixed point.

Figure 4:
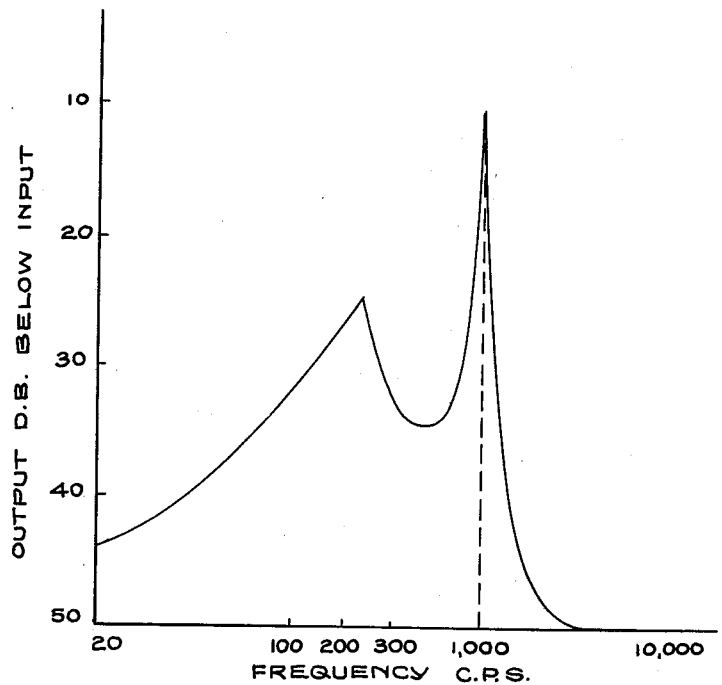
FIGURE 4 is a graph of the frequency characteristic of a mechanical resonator constructed as shown in FIGURE 1.

Curves 2a, 2b and 2c illustrate the torque needed to maintain oscillations in the system of FIGURE 3 at various frequencies. All the curves are drawn assuming that the masses $M_1$ and $M_2$ and shaft 10 remain constant and the mass $M_3$ and spring 11 are modified.

Curve 2a illustrates the condition where mass $M_3$ and spring 11 are made small. Curve 2b illustrates the response where mass $M_3$ is large and there is no spring 11. The dotted curve 12 in FIGURE 2b illustrates the condition where there is a large spring 11 and no mass $M_3$. Curve 2c illustrates the response for a large spring 11 and a large mass $M_3$.

Thus, FIGURE 2 illustrates that if either or both the mass $M_3$ and the spring 11 are increased the natural frequencies due to these elements approach the resonant frequency of the end mass-shaft combination. Under these conditions, unless the mass or spring is infinitely large, the Q of the mechanical system will decrease. It is to be noted that if $f_r$ is the desired resonant operating frequency of the system, curve 2a has only one crossing of the zero torque line near resonance whereas the other curves have secondary resonances near the desired resonant point.

The most practical solution of the problem is to reduce the center mass and spring constant to as low a value as possible, thus making the two undesirable modes move to frequencies that will not lower the system's performance.

FIGURE 1 illustrates a practical apparatus and comprises a base plate 13 upon which are mounted standoffs 14 at either end thereof and which have shafts 16 which come to points that engage transverse members 17 and 18, respectively. The members 17 and 18 are joined by the shaft 19. The center portion of the members 17 and 18 is made of soft iron and at either end are mounted permanent magnets 21 and 22, and 23 and 24, respectively.

Four C-shaped cores 26, 27, 28, and 29 are attached to the base plate and the magnets 21, 22, 23, and 24 are received within their open portions. A winding 31 is wound about the core 26; winding 32 is wound about the core 27; winding 33 is wound about core 28, and winding 34 is wound about core 29. Input terminals 36 and 37 are connected, respectively, to the windings 31 and 32. A lead 38 connects the winding 31 in series with the winding 32. Terminals 39 are located adjacent the cores 28 and 29 and are connected to the windings 33 and 34. Conductor 41 connects the windings 33 and 34 together.

Standoffs 42 and 43 are also mounted on the base plate 13 and might be made of rubber, for example, to provide a damping effect. A rod 44 extends between the standoffs 42 and 43 and is attached to the center of the shaft 19 by means of a member 46. The member 46 is composed of two parts, 47 and 48, which are connected together by suitable holding means. The mass of the member 46 may be made as small as possible. It corresponds to the mass $M_3$ in the analogy of FIGURE 3. The rod 44 corresponds to the spring 11 in FIGURE 3. The members 17 and 18 correspond respectively to the masses $M_1$ and $M_2$ shown in FIGURE 3.

In operation oscillating electrical energy connected to terminals 36 and 37 will energize the assembly 17 comprising the soft iron center portion and the two magnets 21 and 22 if any of the energy has frequencies in the passband of this structure. The coil 31 causes a magnetic field to be induced in the core 26 which biases the permanent magnet 21 toward one of the pole faces. Likewise, the coil 32 induces a field in core 27 which biases the permanent magnet 22 toward one of the pole faces. The coils 31 and 32 are wound so as to cause movement of the magnets in the same angular direction. The rod 44 and members 42 and 43 prevent the assembly 17 from actually hitting the pole pieces. In this manner motion will be coupled to the assembly 18 comprising the soft iron center section and the magnets 23 and 24 through the shaft 19. If electrical energy connected to terminals 36 and 37 has no frequency components within the passband of the filter, the output bar 18 will not be energized.

When the assembly 18 moves it causes an output voltage to be induced in windings 33 and 34. The windings 33 and 34 are connected in series to that the voltage induced when the magnets 23 and 24 move relative to the cores 28 and 29 will add together.

FIGURE 4 illustrates the response curve for a filter with the following dimensions:

Shaft 19, steel, 2.25 inches long, 0.125 inch in diameter
Shaft 44, steel, 2.3 inches long, 0.023 inch in diameter
Members 17 and 18 each 1.170 inches long, 0.25 inch high, 0.238 inch wide, mass 7.8 grams
Air gap of cores 0.020 inch
Members 42 and 43 were made of rubber.

It is seen that this structure had a resonant point at 1,000 cycles and a spurious response at 200 cycles at 20 decibels reduced level.

The resonator center support comprising rod 44 and members 42 and 43 had one purpose—to keep the magnets from locking in on the pole pieces. The springs on the ends of the steel rod may be a damped spring made of rubber.

The rubber members 42 and 43 with rod 44 reduce the amplitude of the spurious response almost 20 decibels, making this method of support very desirable. Just about any type of rubber support can be used, just as long as it is stiff enough to keep the magnets from locking onto the pole pieces and not so stiff that it will increase the spurious frequency to a point where it affects the desired mode of operation.

The rubber spring is coupled to the main shaft through steel rod 44 and the small aluminum connector 46. An attempt was made to keep the mass of the connector and spring support rod as small as possible to reduce the chance of another spurious response (higher) getting too close to the center or desired frequency. The frequency response curve (FIGURE 4) shows that the small center mass affects the resonator performance very little on the high side.

It is seen that this invention provides a novel electromechanical resonator. Although it has been described with respect to a preferred embodiment, it is not to be so limited, as changes and modifications may be made therein which are within the full intended scope of the invention as defined by the appended claims.

What is claimed is:

1. An electromechanical resonator comprising a base member, four C-shaped cores attached to said base member, energizing windings wound about the first pair of C-shaped cores and connected in series, and output windings connected to the second pair of C-shaped cores and connected in series, a shaft extending between said C-shaped cores and pivotally supported from said base member, a pair of transverse members attached to said shaft at either end thereof, a first pair of magnets forming a part of the first transverse member, and said magnets mounted within a first pair of the C-shaped cores, a second pair of magnets forming a part of said second transverse member and mounted between a second pair of the C-shaped cores, a fastening member attached to the center of said shaft, spring biasing means attached to the base and to said fastening member attached to said shaft intermediate the transverse members to prevent said magnets from engaging said cores, and said spring biasing means comprising a flexible rod connected to the fastening member attached to said shaft intermediate the transverse members, and a standoff attached to said base member and to said flexible rod.

2. An electromechanical resonator comprising a base member, four C-shaped cores attached to said base member, energizing windings wound about the first pair of C-shaped cores and connected in series, and output windings connected to the second pair of C-shaped cores and connected in series, a shaft extending between said C-shaped cores and pivotally supported from said base member, a pair of transverse members attached to said shaft at either end thereof, a first pair of magnets forming a part of the first transverse member, and said magnets mounted within a first pair of the C-shaped cores, a second pair of magnets forming a part of said second transverse member and mounted between a second pair of the C-shaped cores, a fastening member attached to the center of said shaft intermediate the transverse members, spring biasing means attached to the base and by said fastening member to said shaft intermediate the transverse members to prevent said magnets from engaging said cores, and said spring biasing means comprising a flexible rod connected to the fastening member attached to said shaft intermediate the transverse members, and a rubber standoff attached to said base member and to said flexible rod to provide mechanical damping.

3. An electromechanical resonator comprising a base member, four C-shaped cores attached to said base member, a shaft extending between said C-shaped cores and pivotally supported from said base member, a pair of transverse members attached to said shaft at either end thereof, a first pair of magnets forming a part of the first transverse member, and said magnets mounted within a first pair of the C-shaped cores, a second pair of magnets forming a part of said second transverse member and mounted between the second pair of C-shaped cores, a fastening member attached to the center of said shaft, a flexible rod extending through said fastening member, and means for substantially preventing endwise rotation of said rod relative to said base member.

References Cited in the file of this patent

UNITED STATES PATENTS

| | | |
|---|---|---|
| 1,681,554 | Norton | Aug. 21, 1928 |
| 1,689,339 | Harrison | Oct. 30, 1928 |
| 2,112,560 | Davis | Mar. 29, 1938 |
| 2,710,943 | Doelz | June 14, 1955 |
| 2,935,706 | Murphy et al. | May 3, 1960 |

FOREIGN PATENTS

| | | |
|---|---|---|
| 1,176,363 | France | Nov. 24, 1958 |